United States Patent
Lee

(10) Patent No.: US 8,836,189 B2
(45) Date of Patent: Sep. 16, 2014

(54) SPINDLE MOTOR HAVING LUBRICANT FILLED BEARING CLEARANCE

(75) Inventor: Jong Ho Lee, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 362 days.

(21) Appl. No.: 13/315,565

(22) Filed: Dec. 9, 2011

(65) Prior Publication Data

US 2012/0169165 A1    Jul. 5, 2012

(30) Foreign Application Priority Data

Dec. 29, 2010  (KR) .................. 10-2010-0138342

(51) Int. Cl.
| | | |
|---|---|---|
| *H02K 7/08* | (2006.01) | |
| *G11B 19/20* | (2006.01) | |
| *F16C 17/10* | (2006.01) | |
| *F16C 33/74* | (2006.01) | |

(52) U.S. Cl.
CPC ............ *H02K 7/085* (2013.01); *G11B 19/2036* (2013.01); *F16C 2370/12* (2013.01); *F16C 17/107* (2013.01); *F16C 33/745* (2013.01)
USPC ....... 310/90; 310/85; 310/67 R; 310/40 MM; 384/100

(58) Field of Classification Search
CPC .......... H02K 7/08; H02K 7/085; F16C 32/06; F16C 21/00
USPC ................ 310/90, 85, 90.5, 67 R, 40 MM; 384/100, 101, 111
See application file for complete search history.

(56) References Cited

U.S. PATENT DOCUMENTS

| | | | |
|---|---|---|---|
| 6,781,268 B2* | 8/2004 | Oku ................................ 310/90 |
| 7,204,642 B2* | 4/2007 | Kodama ........................ 384/107 |
| 2002/0185925 A1* | 12/2002 | Yoshikawa et al. ......... 310/67 R |
| 2003/0020346 A1* | 1/2003 | Ichiyama ........................ 310/90 |
| 2003/0048577 A1 | 3/2003 | Kayama et al. |
| 2005/0025405 A1 | 2/2005 | Tamaoka |
| 2005/0081384 A1 | 4/2005 | Inoue et al. |
| 2007/0194644 A1 | 8/2007 | Kanatani et al. |
| 2008/0036302 A1 | 2/2008 | Kim et al. |
| 2010/0309587 A1* | 12/2010 | Yang .............................. 310/90 |

FOREIGN PATENT DOCUMENTS

| | | |
|---|---|---|
| JP | 2003-70217 | 3/2003 |
| JP | 2004-88816 | 3/2004 |
| JP | 2005-121066 | 5/2005 |
| JP | 2006-38211 | 2/2006 |
| JP | 2007-228707 | 9/2007 |
| JP | 4418528 | 2/2010 |
| JP | 2010-226955 | 10/2010 |

OTHER PUBLICATIONS

Korean Notice of Allowance issued Aug. 17, 2012 in corresponding Korean Patent Application No. 10-2010-0138342.
Japanese Office Action mailed Jun. 25, 2013 in corresponding Japanese Application No. 2011-195871.

* cited by examiner

*Primary Examiner* — Michael Andrews

(57) ABSTRACT

There is provided a spindle motor including: a sleeve rotatably supporting a shaft and having an insertion groove provided in a top surface thereof; and a rotor case mounted on a top end of the shaft and including a protruding wall part inserted into the insertion groove, wherein a lubricant, provided to generate a dynamic pressure when the shaft rotates, forms an interface with air in a clearance formed by the protruding wall part and the insertion groove.

7 Claims, 4 Drawing Sheets

SPINDLE MOTOR HAVING LUBRICANT FILLED BEARING CLEARANCE

CROSS-REFERENCE TO RELATED APPLICATIONS

This application claims the priority of Korean Patent Application No. 10-2010-0138342 filed on Dec. 29, 2010, in the Korean Intellectual Property Office, the disclosure of which is incorporated herein by reference.

BACKGROUND OF THE INVENTION

1. Field of the Invention

The present invention relates to a spindle motor, and more particularly, to a spindle motor in which a bearing clearance is filled with a lubricant.

2. Description of the Related Art

Generally, a small spindle motor used for a hard disk drive (HDD) includes a fluid dynamic bearing assembly. In this case, a bearing clearance formed between a shaft and a sleeve of the fluid dynamic bearing assembly is filled with a lubricant, such as oil, or the like. The shaft is rotatably supported by forming a fluid dynamic pressure while compressing oil filling the bearing clearance.

In addition, the bearing clearance is formed by a top surface of the sleeve and a bottom surface of a rotor case that rotates in connection with the shaft. Meanwhile, a bearing clearance formed by the top surface of the sleeve and the bottom surface of the rotor case is also filled with the lubricant.

Meanwhile, when an impact is transmitted from the outside, the lubricant may be leaked outwardly from the bearing clearance, i.e., the clearance in which an interface between the lubricant and air is formed.

As described above, when the lubricant leaked to the outside is scattered, the inside of the spindle motor is contaminated by the lubricant.

In addition, when the lubricant is leaked to the outside, the fluid dynamic pressure generated by the lubricant is reduced, such that the performance of the spindle motor may be degraded and the usefullifespan thereof may be shortened.

SUMMARY OF THE INVENTION

An aspect of the present invention provides a spindle motor having the reduced leakage and scattering of a lubricant.

According to an aspect of the present invention, there is provided a spindle motor, including: a sleeve rotatably supporting a shaft and having an insertion groove provided in a top surface thereof; and a rotor case mounted on a top end of the shaft and including a protruding wall part inserted into the insertion groove, wherein a lubricant, provided to generate dynamic pressure when the shaft rotates, forms an interface with air in a clearance formed by the protruding wall part and the insertion groove.

The rotor case may further include a scattering prevention part provided outwardly of the protruding wall part in a radial direction, the scattering prevention part preventing the lubricant from being scattered.

The scattering prevention part may be a protrusion extended downwardly from the rotor case in an axial direction.

The interface between the lubricant and the air may be disposed in a clearance formed by an outer surface of the protruding wall part and the insertion groove.

The interface between the lubricant and the air may be disposed in a clearance formed by an inner circumferential surface of the protruding wall part and the insertion groove.

The top surface of the sleeve may include an opposite surface opposing a bottom surface of the rotor case and a spaced surface spaced apart from the bottom surface of the rotor case while being stepped from the opposite surface.

Both sidewalls of the insertion groove may be inclined such that the clearance between the protruding wall part and the insertion groove is widened towards a top portion thereof.

The sleeve may be fixedly mounted on a sleeve housing formed on the base member and the insertion groove may be disposed inwardly of the sleeve housing in a radial direction.

The spindle motor may further include a cover plate mounted on a bottom end of the sleeve to prevent the lubricant from leaking.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will be described with reference to the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
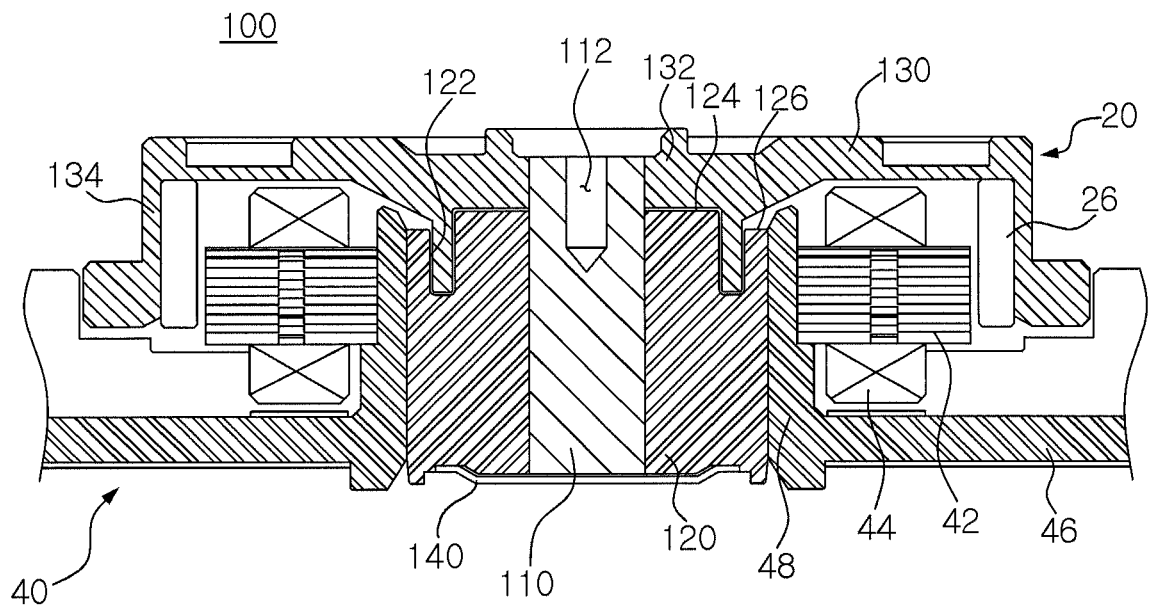
FIG. 1 is a cross-sectional view schematically showing a spindle motor according to an exemplary embodiment of the present invention.
Figure 2:
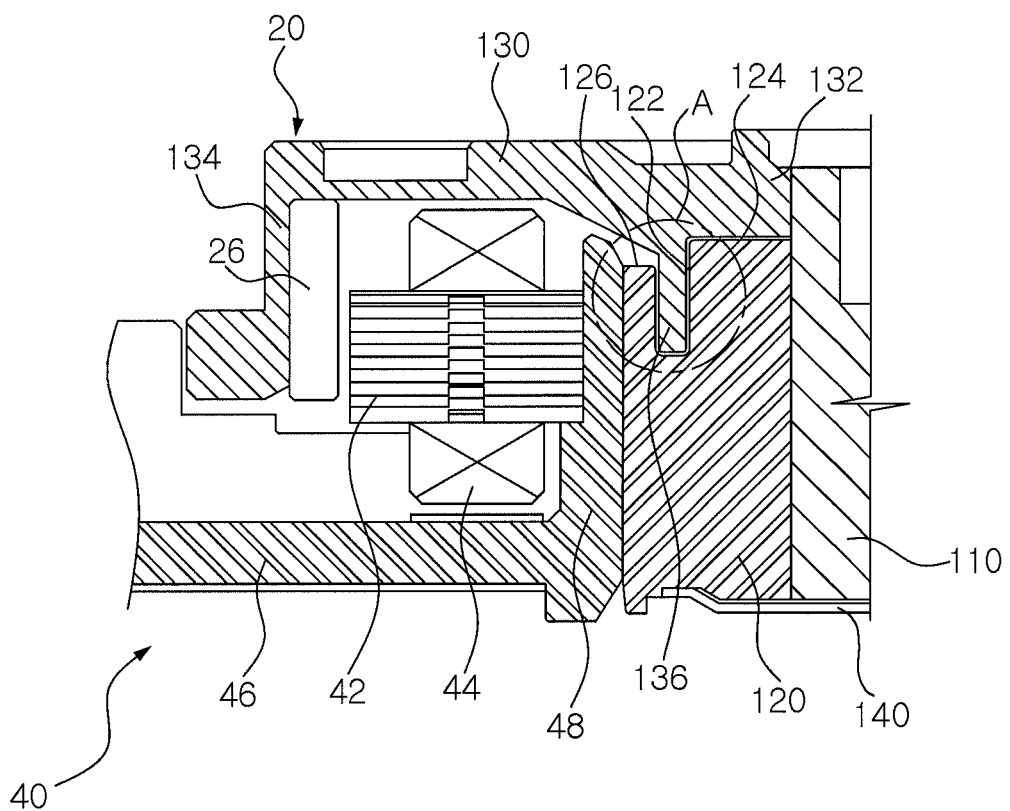
FIG. 2 is an enlarged cross-sectional view of the spindle motor shown in FIG. 1.
Figure 3:
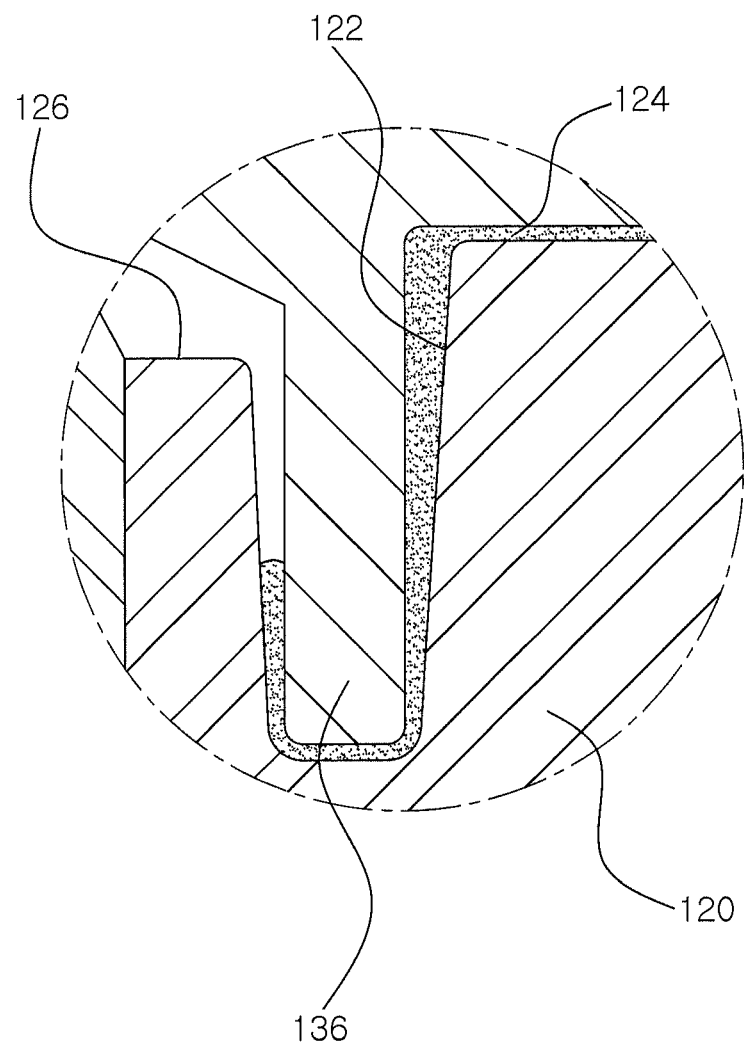
FIG. 3 is an enlarged view of part A of FIG. 2.

FIG. 1 is a cross-sectional view schematically showing a spindle motor according to an exemplary embodiment of the present invention, FIG. 2 is an enlarged cross-sectional view of the spindle motor shown in FIG. 1, and FIG. 3 is an enlarged view of part A of FIG. 1.

Referring to FIGS. 1 to 3, a spindle motor 100 according to an exemplary embodiment of the present invention may include a shaft 110, a sleeve 120, and a rotor case 130.

Meanwhile, the spindle motor 100 may be applied to a recording disk driver rotating a recording disk and may include a rotor 20 and a stator 40.

The rotor 20 may include the cup-shaped rotor case 130 including an annular magnet 26 corresponding to a stator core 42 provided on the inner circumferential portion thereof. Further, the annular magnet 26 is a permanent magnet having N and S poles alternately magnetized in a circumferential direction to generate a magnetic force having a predetermined magnitude.

In addition, the rotor case 130 may include a rotor hub 132 combined with the shaft 110 and a magnet coupling part 134 disposing the annular magnet 26 on the inner surface thereof.

Meanwhile, the stator 40 may be a fixed structure including all the fixed members other than rotating members and may include the stator core 42, a winding coil 44 wound around the stator core 42, a base member 46, and a sleeve housing 48 extended from the base member 46.

In addition, the magnet 26 provided on the inner circumferential surface of the magnet coupling part 134 is disposed to be opposite to the winding coil 44 and the rotor 20 rotates by electromagnetic interaction between the magnet 26 and the winding coil 44. In other words, when the rotor case 130 rotates, the shaft 110 interconnected with the rotor case 130 rotates.

Meanwhile, terms relating to directions are defined. As viewed in FIG. 1, an axial direction refers to a vertical direction based on the shaft 110, a radial direction refers to an outer direction toward the outer edge of the rotor case 130 based on the shaft 100 or a central direction toward the shaft 110 based on the outer edge of the rotor case 130, and a circumferential direction refers to a direction of rotation of the outer circumferential surface of the shaft 110.

The shaft 110 is rotatably mounted on the sleeve 120. In addition, the shaft 110 may have a cylindrical shape and has a screw hole 112 in the top surface thereof, in which a mounting member for mounting a recording disk is inserted into the screw hole 112.

In addition, the shaft 110 is mounted on the sleeve 120 to have a bearing clearance therebetween. The bearing clearance may be filled with a lubricant.

The sleeve 120 rotatably supports the shaft 110 and has an insertion groove 122 in the top surface thereof.

Meanwhile, the top surface of the sleeve 120 may include an opposite surface 124 opposing the bottom surface of the rotor case 130 and a spaced surface 126 disposed to be spaced apart from the bottom surface of the rotor case 130 while being stepped from the opposite surface 124.

In addition, the insertion groove 122 may be disposed between the opposite surface 124 and the spaced surface 126.

Also, the sleeve 120 is fixedly mounted on the sleeve housing 48 formed on the base member 46 and the insertion groove 122 may be disposed inwardly of the sleeve housing 48 in the radial direction.

In addition, both sidewalls of the insertion groove 122 may be inclined to form the interface between the lubricant and air as shown in more detail in FIG. 3. That is, the insertion groove 122 may be inclined to have a width widened from the bottom surface of the insertion groove 122 toward the top thereof.

The rotor case 130 is mounted on the top end of the shaft 110 and includes a protruding wall part 136 disposed to be inserted into the insertion groove 122.

Meanwhile, the protruding wall part 136 may be inserted into the insertion groove 122 of the sleeve 120 when the rotor case 130 is mounted on the shaft 110.

Further, the lubricant, provided to generate a dynamic pressure at the time of the rotation of the shaft 110, forms the interface with the air in the clearance formed by the protruding wall part 136 and the insertion groove 122.

That is, the lubricant, filling the bearing clearance formed by the sleeve 120 and the shaft 110, also fills a bearing clearance formed by the bottom surface of the rotor case 130 and the opposite surface 124 of the sleeve.

Further, the lubricant also fills the clearance formed by the insertion groove 122 and the protruding wall part 136 to thereby form the interface with the air.

In addition, the interface between the lubricant and the air may be disposed in the clearance formed by the outer surface of the protruding wall part 136 and the insertion groove 122. In other words, as shown in FIG. 3, the interface between the lubricant and the air may be disposed in the clearance formed by the outer surface of the protruding wall part 136 and the side wall of the insertion groove 122.

As described above, since the interface between the lubricant and the air may be formed in the insertion groove 122, the lubricant may not drip downwardly even in the case that an external impact is transmitted thereto, such that the lubricant can be prevented from leaking to the outside.

That is, even in the case that an upward or downward external impact is transmitted thereto, the interface between the lubricant and the air is formed upwardly, such that the leakage due to the dripping of the lubricant can be prevented.

Figure 4:
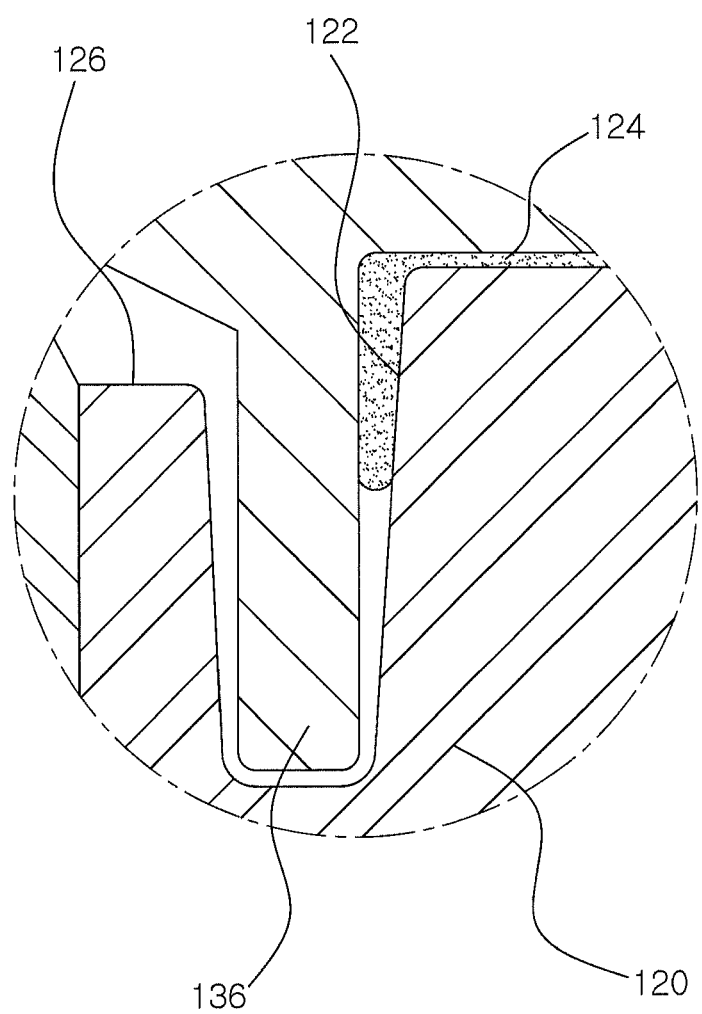
FIG. 4 is an enlarged view showing the filling state of the lubricant shown in FIG. 3 and another filling state of the lubricant.

Further, as shown in FIG. 4, the interface between the lubricant and the air may be disposed in the clearance formed by the outer surface of the protruding wall part 136 and the side wall of the insertion groove 122.

In this case, even in the case that the external impact is transmitted thereto, the lubricant drips to the inside of the insertion groove 122, such that the leakage of the lubricant to the outside of the insertion groove 122 may be reduced.

Meanwhile, the spindle motor 100 according to the exemplary embodiment of the present invention may further include a cover plate 140 mounted on the bottom end of the sleeve 120 to prevent the leakage of the lubricant.

Therefore, the lubricant filling the bearing clearance formed by the shaft 110 and the sleeve 120 may be prevented from leaking downwardly of the shaft 110.

As described above, the interface between the lubricant and the air is formed in the bearing clearance formed by the insertion groove 122 formed on the sleeve 120 and the protruding wall part 136 extended from the rotor case 130, such that the lubricant may be prevented from leaking to the outside of the bearing clearance.

Hereinafter, a spindle motor according to another exemplary embodiment of the present invention will be described with reference to the drawings. However, a detailed description of the same components as those described above will be omitted and therefore, only components, which are not described above, will be described.

Figure 5:
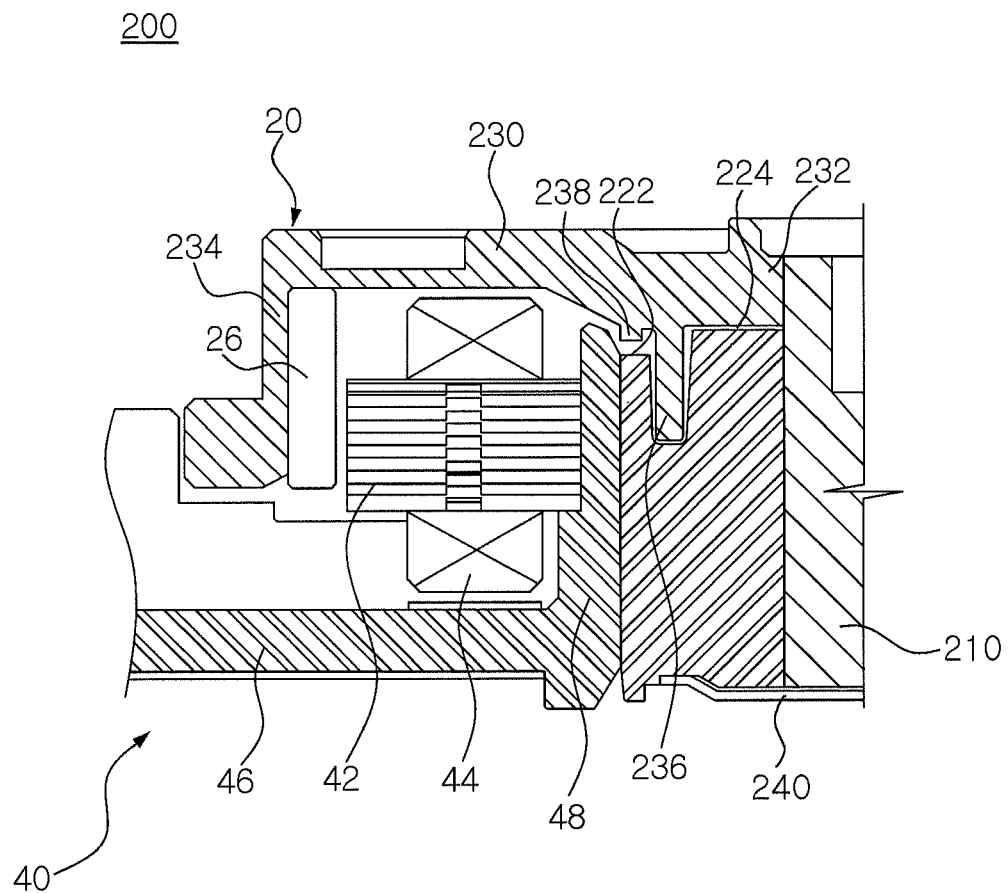
FIG. 5 is a cross-sectional view schematically showing a spindle motor according to another exemplary embodiment of the present invention.

FIG. 5 is a cross-sectional view schematically showing a spindle motor according to another exemplary embodiment of the present invention.

Referring to FIG. 5, a spindle motor 200 according to another exemplary embodiment of the present invention may include a shaft 210, a sleeve 220, a rotor case 230, and a cover plate 240.

In the exemplary embodiment of the present invention, the shaft 210, the sleeve 220, and the cover plate 240 correspond to the shaft 110, the sleeve 210, and the cover plate 140 included in the spindle motor 100 in the aforementioned embodiment and therefore, a detailed description thereof will be omitted.

In addition, the rotor case 230 has the same configuration as that of the rotor case 130 described above other than a scattering prevention part 238 and therefore, only the scattering prevention part 238 will be described.

The scattering prevention part 238 is formed outwardly of the protruding wall part 236 in the radial direction in order to prevent the scattering of the lubricant. That is, the scattering prevention part 238 may be a protrusion extended downwardly from the rotor case 230 in the axial direction.

Further, the scattering prevention part 238 may have a ring shape when being viewed from the bottom.

Therefore, even in the case that the lubricant is leaked from the insertion groove 222 of the sleeve 220, the scattering prevention part 238 prevents the lubricant from leaking outwardly of the scattering prevention part 238 in the radial direction, such that the scattering of the lubricant into the inside of the spindle motor may be reduced.

As described above, the scattering of the lubricant to the stator core may be reduced by the scattering prevention part, even in the case that the lubricant is leaked to the outside of the bearing clearance.

As set forth above, in exemplary embodiments of the present invention, the leakage of a lubricant to the outside of a bearing clearance may be reduced by forming an interface between the lubricant and air in the bearing clearance formed by an insertion groove formed on a sleeve and a protruded wall part extended from a rotor case.

In addition, the scattering of the lubricant to a stator core may be reduced by a scattering prevention part, even in the case that the lubricant is leaked to the outside of the bearing clearance.

While the present invention has been shown and described in connection with the exemplary embodiments, it will be apparent to those skilled in the art that modification and variation can be made without departing from the spirit and scope of the invention as defined by the appended claims.

What is claimed is:

1. A spindle motor comprising:
   a sleeve rotatably supporting a shaft and having an insertion groove provided in a top surface thereof; and
   a rotor case mounted on a top end of the shaft and including a protruding wall part inserted into the insertion groove,
   wherein a lubricant, provided to generate a dynamic pressure when the shaft rotates, forms an interface with air in a clearance formed by the protruding wall part and the insertion groove,
   wherein the top surface of the sleeve includes an opposite surface opposing a bottom surface of the rotor case and a spaced surface spaced apart from the bottom surface of the rotor case while being stepped from the opposite surface, and
   wherein the insertion groove comprises sidewalls, the sidewalls of the insertion groove being inclined such that the clearance between the protruding wall part and the insertion groove is widened towards a top portion of the insertion groove.

2. The spindle motor of claim 1, wherein the rotor case further includes a scattering prevention part provided outwardly of the protruding wall part in a radial direction, the scattering prevention part preventing the lubricant from being scattered.

3. The spindle motor of claim 2, wherein the scattering prevention part is a protrusion extended downwardly from the rotor case in an axial direction.

4. The spindle motor of claim 1, wherein the interface between the lubricant and the air is disposed in a clearance formed by an outer surface of the protruding wall part and the insertion groove.

5. The spindle motor of claim 1, wherein the interface between the lubricant and the air is disposed in a clearance formed by an inner circumferential surface of the protruding wall part and the insertion groove.

6. The spindle motor of claim 1, wherein the sleeve is fixedly mounted on a sleeve housing formed on a base member and the insertion groove is disposed inwardly of the sleeve housing in a radial direction.

7. The spindle motor of claim 1, further comprising a cover plate mounted on a bottom end of the sleeve to prevent the lubricant from leaking.

\* \* \* \* \*